Patented June 21, 1932

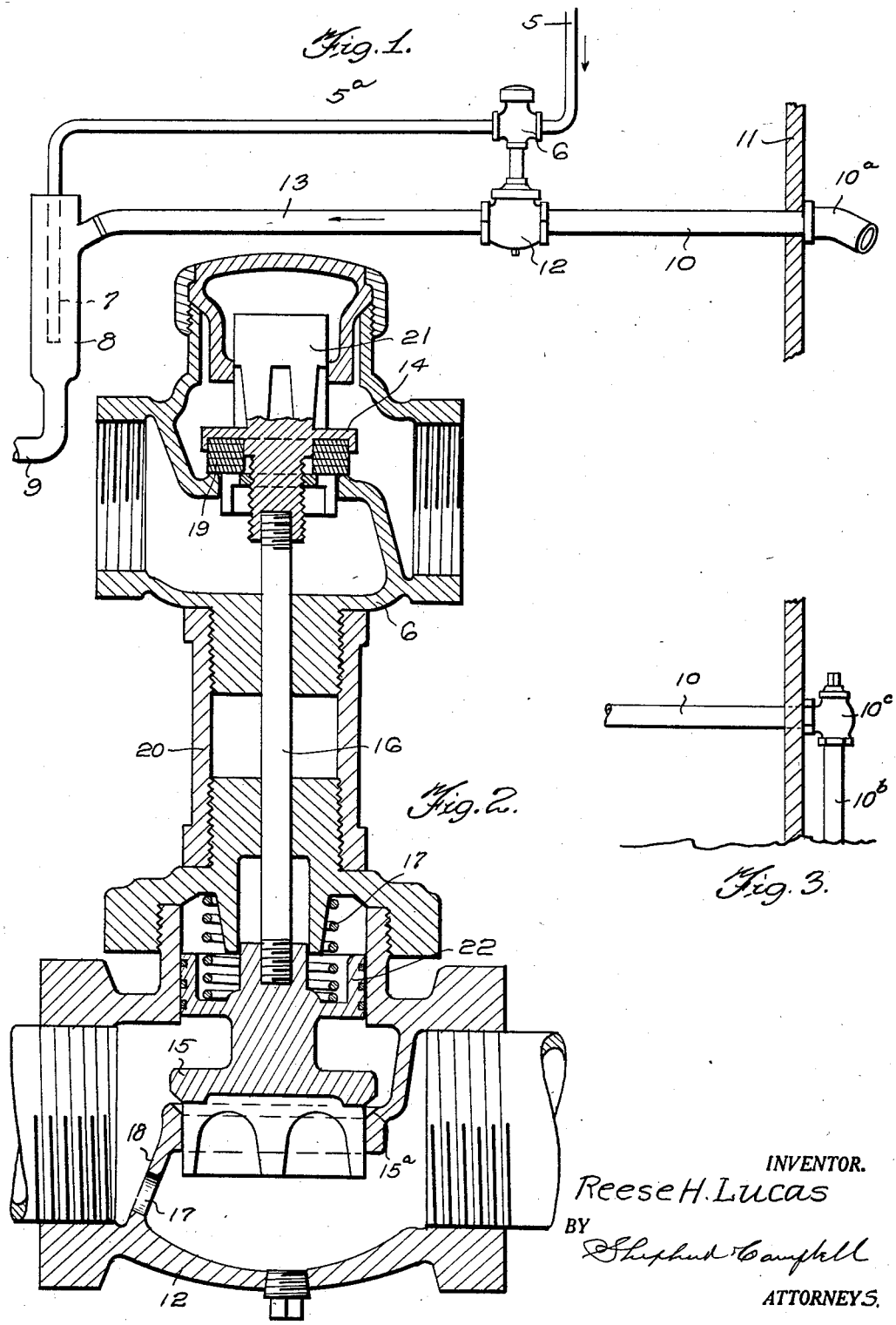

1,864,250

UNITED STATES PATENT OFFICE

REESE H. LUCAS, OF WASHINGTON, DISTRICT OF COLUMBIA

METHOD OF AND MEANS FOR DISPOSING OF DANGEROUS FLUIDS

Application filed February 6, 1931. Serial No. 514,049.

This invention relates to a method of and means for disposing of dangerous liquids or gases and more particularly to a method of and means for discharging ammonia and like substances from refrigerating systems into sewers under certain emergency conditions. It is present practice to provide means by which the refrigerating medium, such as ammonia, for example, may be discharged from the refrigerating systems of buildings, such as apartment houses, for example, into the sewer, drain or any other place the local authorities governing same may permit under such emergency conditions as when the building is threatened by fire, for example.

The refrigerating substances employed are frequently of such a nature as to render their handling more or less dangerous, particularly since the substance employed and which for convenience will hereinafter be referred to as ammonia, is usually under high pressure. The standard regulations adopted by many cities and which appear to be likely to become general throughout the country, provide that dangerous liquids must not be discharged into the sewer in concentrated form, but, upon the contrary, must be mixed with some harmless diluent such as water before being permitted to enter the sewer and it is the practice to provide that the apparatus provided include means, controllable from the exterior of the building, so that a fireman may readily reach the same, whereby water may be started to flowing to the sewer for the purpose of diluting the ammonia, before the latter is released. As this description proceeds, it will be seen that the method and apparatus herein proposed will satisfactorily meet all requirements and will insure that water will be flowing to the mixing chamber before the ammonia is permitted to enter the same and that the apparatus will function satisfactorily under all variations and differences in pressure between the water supply line and the ammonia line. Briefly stated, the invention resides in providing means controllable by the pressure in a water supply line for opening a valve in the ammonia line after a flow of water has been established in the mixing chamber, where the water and ammonia are intermingled. In the accompanying drawing:

Fig. 1 is a diagrammatic view of a system adapted to carry out the invention;

Fig. 2 is a sectional view of the automatic duplex valve, hereinafter described; and Fig. 3 is a detail view illustrating a source of water supply from a city main, as hereinafter described.

Like numerals designate corresponding parts in all of the figures of the drawing.

In the drawing, 5 designates the ammonia line from a refrigerating system, of any nature, and which may be the refrigerating system of a building of a considerable size, such as an apartment house, for example.

Disposed in the length of this ammonia line is an upper valve casing 6 containing a valve which controls the flow of the ammonia from the line 5 through the branch line 5$^a$ to a perforated diffuser pipe 7 that is disposed in a mixing chamber 8. The lower end of this chamber is connected with the sewer, as indicated at 9. A water supply line 10 leads through the wall 11 of the building and is connected to one side of a lower valve casing 12, containing a valve, hereinafter described, which controls the flow of water through branch line 13 to the mixing chamber 8. The supply of water through pipe 10 may be from any desired source.

In Figure 1 I have illustrated the pipe 10 as extending outside of the building and being there provided with a conventional connection 10$^a$ adapted to have a fire-engine hose connected thereto, this connection being like the conventional Siamese connection employed upon stand pipes and the like, for fire protection purposes, while in Figure 3, I have indicated the pipe 10 as receiving its supply from a city service line 10$^b$, the control valve 10$^c$ in said line being located outside of the building wall, so that a fireman may have access thereto without entering the building.

Referring now to Fig. 2, it will be seen that the passage of ammonia through the valve casing 6 is controlled by the ammonia valve 14 and that the passage of water through the casing 12 is controlled by a valve 15. These valves are connected by the valve stem 16 and a spring 17 tends to move the valve 14 to seating position. I, preferably, arrange the valve 15 in such manner with respect to its seat 15ᵃ that even when the valve 14 is seated, valve 15 is slightly open, so that there may be a flow of water past the valve 15 prior to any upward movement of the same and, consequently, prior to any opening movement of valve 14.

I further contemplate providing a bypass opening 17 in the web 18 of valve casing 12 for the same purpose. It is apparent that the admission of water under pressure through the pipe line 10 to the under side of the valve 15 will result, first, in establishing a flow of water through pipe 13 to the mixing chamber and, thereafter, in the lifting of valve 15, stem 16 and valve 14, whereupon the ammonia will be permitted to flow to the mixing chamber there to be diluted by the water and discharged into the sewer, drain or any other place the local authorities may permit, such as a court or other area. The valve 14 comprises a disc 19 that is resistant to the action of ammonia. The two valve casings are supported in proper relation to each other by means of a spacing sleeve 20. However, the detail construction of the duplex valve is not of the essence of the invention, since many ways will readily suggest themselves to the skilled engineer of mounting these two valves in proper relation to each other. However the construction shown includes the provision of suitable guiding means 21 and 22 by which the easy movement of the valves, without danger of sticking, is insured.

While I have referred to ammonia, it is to be understood that this term is to be construed broadly, since it is apparent that the particular nature of the dangerous substance discharged has nothing to do with the principle involved and that the apparatus shown and described may be used to control other dangerous fluids. While the elements shown and described are well adapted to serve the purpose intended, it is to be understood that the invention is not limited to any one mechanical embodiment, but that it includes within its purview whatever changes fairly come within either the terms or the spirit of the appended claims.

Having described my invention, what I claim is:

1. The herein described method of effecting the discharge and dilution of a refrigerating medium which consists of first establishing a flow of water to a point of mixing and thereafter bringing about a flow of the refrigerating medium to said point of mixing by the action of the pressure of the said water.

2. In combination, a pressure operated element, means for delivering water pressure thereto, means for conducting water therefrom to a mixing chamber and an ammonia controlling valve actuated under the movement of said pressure operated element.

3. In combination, a pressure operated element, a water line leading thereto, from a point external of a building to be protected, a fire engine connection upon said line externally of said building, means for conducting water from the pressure operated element to a mixing chamber and an ammonia controlling valve actuated under the movement of the pressure operated element.

4. In combination, a pair of valve casings and valves therein, means for connecting said valves whereby one of said valves is moved under the influence of the movement of the other, one of said valves constituting a water pressure operated member and the other of said valves constituting an ammonia controlling element, an ammonia line controlled by the ammonia controlling element, a water line connected to the casing of the water pressure operated valve, a mixing chamber and means for conducting water from the water pressure operated valve and ammonia from the ammonia controlling valve to said mixing chamber.

5. A structure as recited in claim 4 in combination with means for permitting a flow of water past the pressure operated valve prior to the movement of said valve under pressure.

6. A structure as recited in claim 4 in combination with a water line controllable from a point outside of the building to be protected, for supplying water under pressure to the pressure operated valve.

7. A structure as recited in claim 4, in combination with means accessible from the exterior of a building to be protected, for establishing connection between said pressure operated valve and a fire engine.

8. A structure as recited in claim 4, in combination with a pipe line leading from the inlet side of the pressure operated valve casing to a point outside the wall of the building to be protected, and a connection outside of said building adapted to receive a fire engine hose.

9. In combination, an ammonia line, a water line, a mixing chamber to which the ammonia line and water line are connected, a duplex valve structure comprising valves disposed in the ammonia and water lines respectively, means connecting said valves whereby the ammonia valve is moved under the influence of the valve of the water line and a spring tending to move the valve in the water line in a closing direction.

10. In combination, a pressure operated element, means for delivering water thereto, a refrigerant controlling valve actuated under the movement of said pressure operated element, and a waste line into which the refrigerant is discharged when the refrigerant controlling valve is opened.

11. The herein described method of protecting buildings from the endangering of human life by refrigerant fumes therein which consists of setting up a flow of water from a point outside of said buildings and discharging a refrigerant located within said buildings, wholly under the influence of the water flow.

12. The herein described method of protecting buildings from the endangering of human life by refrigerant fumes therein which consists of setting up a flow of water from a point outside of said buildings and discharging a refrigerant located within said buildings, wholly under the influence of the water flow, and diluting the refrigerant with said water.

13. The combination with a building to be protected, of a source of water supply controllable from a point outside of said building, means for conducting the water to a point of mixing, and a refrigerant controlling means operable by the presence of said water.

In testimony whereof I affix my signature.

REESE H. LUCAS.